(12) United States Patent
Waltenberg et al.

(10) Patent No.: US 9,732,711 B2
(45) Date of Patent: Aug. 15, 2017

(54) FILTER DEVICE, IN PARTICULAR FOR GAS FILTRATION

(71) Applicant: MANN+HUMMEL GMBH, Ludwigsburg (DE)

(72) Inventors: Klaus Waltenberg, Grossbottwar (DE); Bernd Joos, Lorch (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 152 days.

(21) Appl. No.: 14/627,838

(22) Filed: Feb. 20, 2015

(65) Prior Publication Data

US 2015/0159600 A1 Jun. 11, 2015

Related U.S. Application Data

(63) Continuation of application No. PCT/EP2013/067399, filed on Aug. 21, 2013.

(30) Foreign Application Priority Data

Aug. 22, 2012 (DE) .................. 10 2012 016 557

(51) Int. Cl.
*F02M 35/024* (2006.01)
*B01D 46/24* (2006.01)

(52) U.S. Cl.
CPC ... *F02M 35/02416* (2013.01); *B01D 46/2414* (2013.01); *F02M 35/02483* (2013.01); *B01D 2265/021* (2013.01); *B01D 2265/028* (2013.01)

(58) Field of Classification Search
CPC ............ B01D 46/2411; B01D 46/2414; B01D 2265/021; B01D 2265/026; B01D 2265/028; F02M 35/02416; F02M 35/02483
See application file for complete search history.

(56) References Cited

U.S. PATENT DOCUMENTS

| | | | |
|---|---|---|---|
| 2003/0121242 A1 | 7/2003 | Rieger et al. | |
| 2009/0094951 A1* | 4/2009 | Baseotto | B01D 46/0024 55/498 |
| 2012/0198802 A1 | 8/2012 | Menssen | |

(Continued)

FOREIGN PATENT DOCUMENTS

| | | |
|---|---|---|
| DE | 202007002906 U1 | 7/2008 |
| DE | 102008063720 A1 | 6/2010 |

(Continued)

*Primary Examiner* — Robert Clemente
(74) *Attorney, Agent, or Firm* — James Hasselbeck

(57) ABSTRACT

A filter device is provided with a filter housing and a housing cover closing off the filter housing. A filter element is disposed in the filter housing. The filter element has a clamping element that is resting with a clamping force on a first housing part that is provided on the filter housing or on the housing cover. The filter element further has a lever element that, in the mounted state of the filter element in the filter housing, is resting on a second housing part that is provided on the filter housing or on the housing cover and force-loads the clamping element against the first housing part. The clamping element and the lever element form a single part and are preferably provided on an end disk of the filter element.

14 Claims, 3 Drawing Sheets

(56) References Cited

U.S. PATENT DOCUMENTS

2015/0082982 A1* 3/2015 Ruhland ............ B01D 46/0024
  95/273
2015/0113931 A1* 4/2015 Bartel ................ B01D 46/2414
  55/498

FOREIGN PATENT DOCUMENTS

| EP | 1839723 A1 | 10/2007 |
| EP | 2236187 B1 | 10/2010 |

* cited by examiner

FILTER DEVICE, IN PARTICULAR FOR GAS FILTRATION

CROSS-REFERENCE TO RELATED APPLICATIONS

This application is a continuation application of international application No. PCT/EP2013/067399 having an international filing date of 21 Aug. 2013 and designating the United States, the International Application claiming a priority date of 22 Aug. 2012, based on prior filed German patent application No. 10 2012 016 557.9, the entire contents of the aforesaid international application and the aforesaid German patent application being incorporated herein by reference.

BACKGROUND OF THE INVENTION

The invention concerns a filter device, in particular for gas filtration, for example, an air filter for motor vehicles, comprising a filter element that is received in a filter housing which can be closed off by a housing cover.

EP 2 236 187 B1 discloses an air filter for a motor vehicle that comprises, disposed in a filter housing, a filter element that is designed hollow-cylindrical and is flowed through in radial direction by the sucked-in fresh air. At an end disk at an end face of the filter element, a radially projecting holding tab is formed which, in the mounted state, projects with form fit into a recess in the housing and is pushed by a housing cover into the recess. In this way, the holding tab is secured with form fit in circumferential direction as well as in axial direction. A prerequisite is a recess that is formed complementary to the holding tab at the inner side of the filter housing.

SUMMARY OF THE INVENTION

The invention has the object to configure a filter device with simple constructive measures in such a way that the filter element is securely held within the filter housing.

This object is solved according to the invention in that on the filter element a clamping element is arranged that is resting with a clamping force on a first housing part and in that additionally on the filter element a lever element is arranged that, in the mounted state of the filter element, is resting on a further housing part and force-loads the clamping element against the first housing part. The dependent claims provide expedient further embodiments.

The invention relates to a filter device for filtration of a fluid, in particular a gaseous fluid, wherein optionally also a filtration of liquid media is conceivable. According to a preferred embodiment, the inventive filter device is used as an air filter for motor vehicles, in particular for an internal combustion engine or for fresh air that is supplied to the interior (cabin) of the motor vehicle.

The filter device comprises a filter element that is flowed through by the fluid to be purified and is received in a filter housing which is closable by a housing cover. For a secure receiving action in the filter housing, on the filter element a clamping element is arranged that, in the mounted state, is resting with a clamping force on a first housing part. The first housing part is preferably a component of the filter housing wherein optionally the first housing part can be arranged also on the housing cover.

In addition to the clamping element, a lever element is also arranged on the filter element and, in the mounted state, is resting on an additional second housing part and force-loads the clamping element against the first housing part. The additional second housing part is preferably arranged on the housing cover in case the first housing part is arranged on the filter housing. In principle, a reverse configuration is also possible in which the first housing part is arranged on the housing cover and the second housing part on the filter housing.

In this embodiment, the lever element serves for exerting a clamping force onto the clamping element with which the clamping element is supported on the first housing part. At least in circumferential direction—in rotational direction about the longitudinal axis of the filter element—the connection between the filter element and the filter housing is realized thus in a force-fit way so that additional constructive configurations in the filter housing or in the filter cover for form-fittingly receiving the filter element on the filter housing/housing cover are unnecessary. Preferably, the filter element is received exclusively with force fit in circumferential direction within the filter housing. On the other hand, the filter element is supported on the filter housing in axial direction so that insofar a form-fit receiving action of the filter element in the filter housing is provided in axial direction.

The force which is acting by means of the lever element is transferred onto the clamping element which is force-loaded against the housing component.

It may be expedient to embody the clamping element and the lever element as a single part, for example, integrally formed on an end disk of the filter element that is preferably comprised of plastic material. In a preferred embodiment, the filter element is of a hollow-cylindrical configuration and is radially flowed through by the fluid to be filtered. At least one end face, preferably both end faces of the hollow-cylindrical filter element, are covered by end disks wherein one of the end disks is provided with the clamping element and the lever element, while the oppositely positioned end disk is formed without such components. As an alternative to a single-part configuration of clamping element and lever element with the end disk of the filter element, a separate configuration is conceivable also; in this case, the clamping element and the lever element are however connected with the filter element, preferably with the end disk, for example, by mechanical attachment or by gluing, welding or the like.

According to an expedient embodiment, the clamping element and the lever element together form a structural unit with an at least approximately V-shaped cross-section. The lever element can be loaded adjacent to its free end face by the second housing part whereby the preferably elastic springy lever element is tensioned and applies a force onto the clamping element that is supported with a clamping force on the first housing part. The force of the lever element is transmitted via the connecting locations between lever element and clamping element and transferred onto the clamping element.

In principle, it is advantageous when at least the lever element is elastic springy wherein also non-springy embodiments are possible. Optionally, the clamping element is also designed to be elastic springy, wherein in this case a non-springy embodiment is possible also.

Moreover, different orientations of clamping element and lever element relative to the longitudinal axis of the filter element are conceivable. According to an advantageous embodiment, the clamping element is straight and extends at least approximately in the direction of the longitudinal axis of the filter element. The supporting action of the clamping element is realized in radial direction at the first housing part. However, an extension in radial direction and a supporting action in axial direction are possible also.

The lever element is advantageously arranged at an angle relative to the clamping element, for example, in case of a V-shaped configuration at an angle between 45° and 90° in the unloaded initial state.

The lever element and the clamping element are expediently embodied to be segment-shaped and extend in circumferential direction only about a limited angular segment. This configuration is sufficient for a satisfactory frictional connection between the clamping element and the housing part. Distributed about the circumference, either only a single clamping element and a single lever element or several clamping elements and several lever elements can be provided. According to a further alternative embodiment, the clamping element extends in a ring shape and advantageously the lever element also extends in a ring shape, wherein also embodiments are possible in which only the clamping element is ring-shaped while the lever element is segment-shaped. Alternatively, the lever element can be ring-shaped and the clamping element can be segment-shaped. The lever element and/or the clamping element can be realized as a flat surface or in an arc shape, for example, extending at a radius about the longitudinal axis of the filter element.

The lever element and/or the clamping element can project axially and/or radially past the contour of the end disk or the contour of the filter element.

According to a further expedient embodiment which is relating to a hollow-cylindrical filter element, a central recess is provided in one of the end disks at the end faces to which a sealing part is injection-molded that is resting seal-tightly on the housing cover. The sealing part is expediently connected by a 2-component manufacturing method with the component and is located in particular on the end face of the filter element which is facing away from the clamping element and lever element. The sealing part enables a satisfactorily stable connection between the filter element and the housing cover so that additional connecting measures, for example, a screw connection between filter element and housing cover, are not necessary.

Advantageously, a positioning device between the filter element in the housing part that is receiving the filter element is provided so that, when assembling the filter device, the filter element can be mounted only in a predetermined position that is defined by the positioning device.

This positional fixation can be ensured, for example, by a pin-bore or tongue-groove arrangement. Also, an arrangement of ribs or spurs in a housing part or in the filter element and corresponding recesses or locking contours on the filter element or in a housing part can be provided as positioning device.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
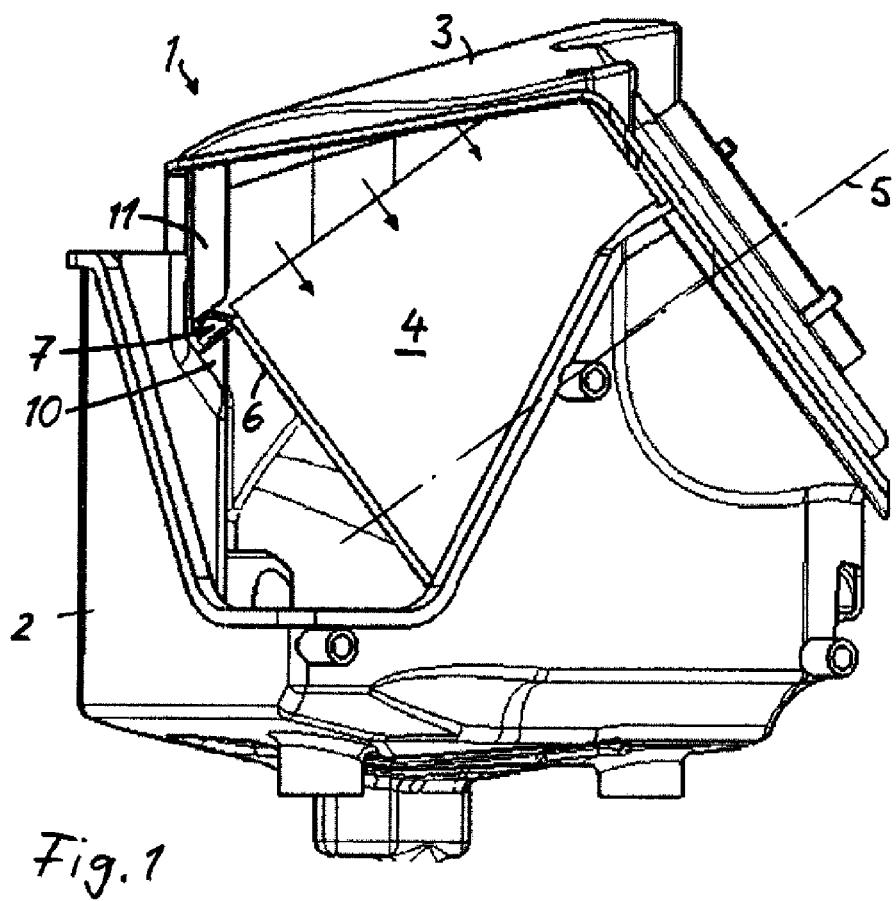
FIG. 1 shows an air filter with a hollow-cylindrical filter element in a filter housing which is to be closed off by a housing cover.

In FIG. 1, an air filter for the internal combustion engine of a motor vehicle is illustrated as a filter device 1 and comprises a filter housing 2 which can be closed off by a housing cover 3. In the filter housing 2, a hollow cylindrical filter element 4 is received that, relative to its longitudinal axis 5 can be flowed through radially from the exterior to the interior by the sucked-in ambient air, as indicated by the arrows. The interior of the filter element 4 represents the clean side from which the purified fluid is discharged axially.

As can be seen in FIG. 1 in connection with the other Figures, on a closed end disk 6 on an end face of the filter element 4, a structural unit 7 is arranged for clamping the filter element in the housing 2 or on the housing cover 3. The structural unit 7 is comprised of a clamping element 8 and a lever element 9 which together form an approximately V-shaped cross-section. The clamping element 8 and the lever element 9 are monolithically formed on the end-face end disk 6, which is comprised of plastic material, and project axially and radially past the contour of the end disk or of the filter element. The clamping element 8 extends parallel to the longitudinal axis 5 of the filter element 4, the lever element 9 is positioned relative to the clamping element 8 at an angle which in the undeformed state is approximately 45°. The clamping element 8 is positioned at the axial end face within the outer contour that is determined by the wall surface, the lever element 9 is also joined to the end disk 6 at the axial end face but extends in radial direction past the outer contour. The end section of the clamping element 9 is bent over in axial direction. The clamping element 8 is positioned in radial direction on a housing part in the form of support section 10 which is arranged on the inner wall of the filter housing 2 and is formed monolithic with the filter housing. The lever element 9 in the mounted state is loaded by a further housing part in the form of support section 11 that is arranged on the inner side of the housing cover 3 and formed monolithic therewith. The lever element 9 is designed to be elastic springy. By force loading of the lever element 9 by the support section 11 on the housing cover 3, the lever element 9 is tensioned and a clamping force acting in radial direction is transmitted onto the clamping element 8 which is supported on the first support section 10 on the filter housing 2 in radial direction. The clamping element 8 is in this context of a stiff configuration. It is resting on a housing contour.

Figure 2:
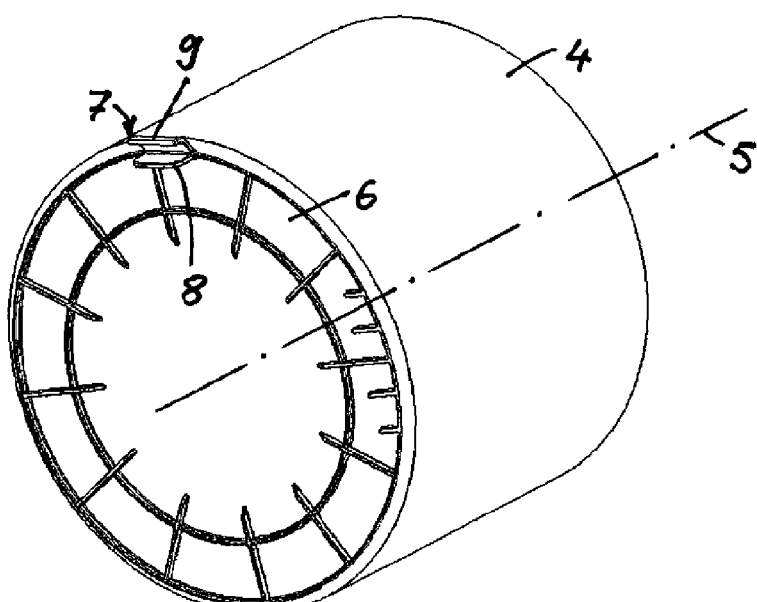
FIG. 2 shows the hollow-cylindrical filter element in perspective illustration.

As can be seen, for example, in FIG. 2, the clamping element 8 and the lever element 9 are each designed to be segment-shaped and extend in circumferential direction only about a limited angular segment of a few degrees. On the end disk 6, precisely one clamping element 8 and one lever element 9 are arranged.

Figure 3:
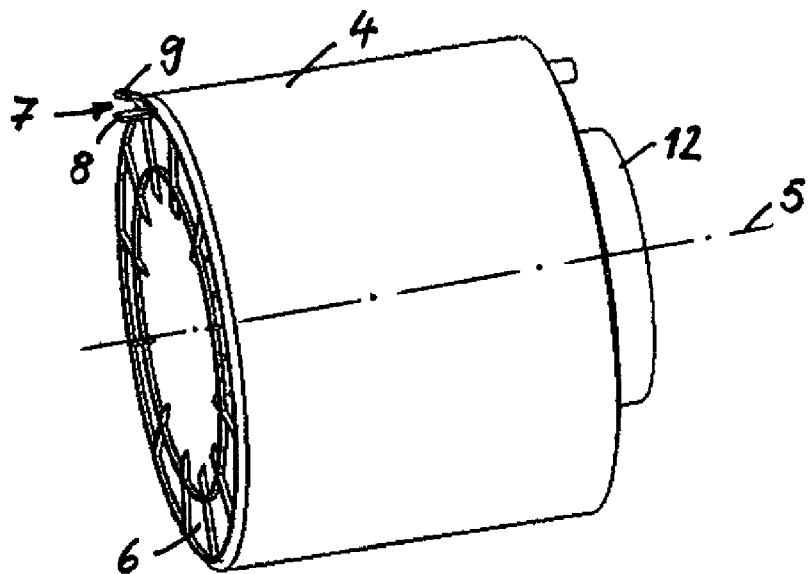
FIG. 3 shows the filter element in another perspective view.
Figure 4:
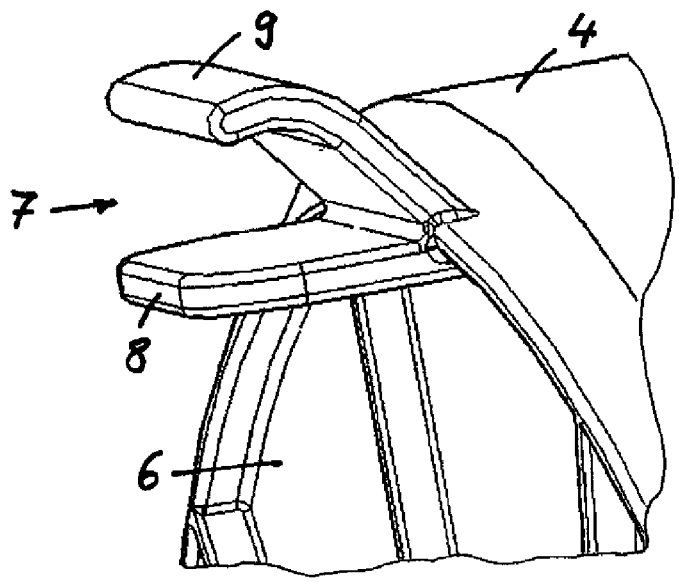
FIG. 4 shows in an enlarged illustration a clamping element and a lever element which are formed on an end disk of the filter element.
Figure 5:
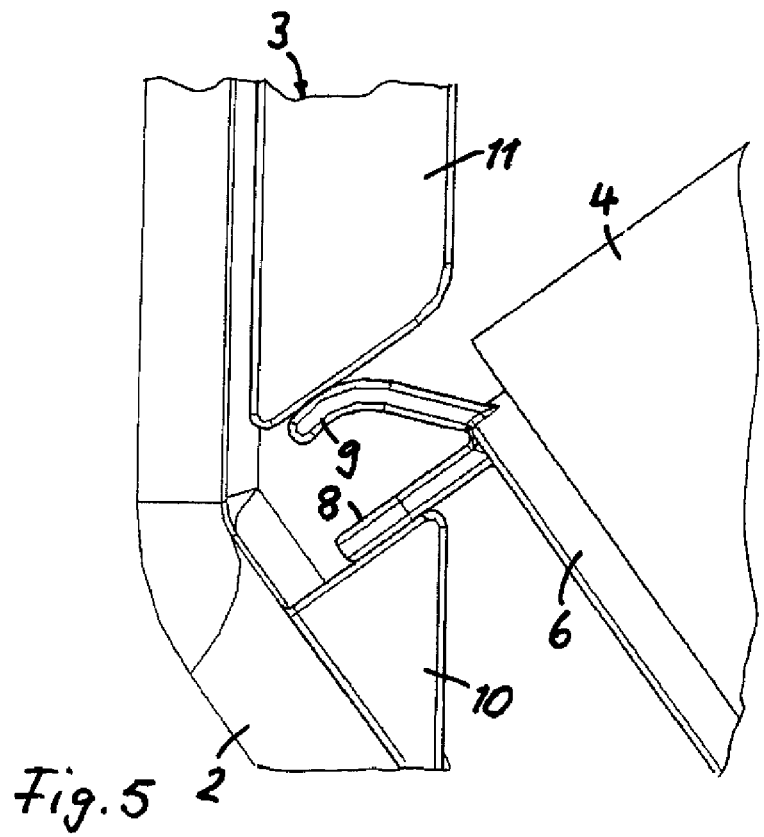
FIG. 5 shows clamping element and lever element in the mounted state in the filter housing.

On the end face which is axially opposite the clamping element 8 and the lever element 9, a sealing part 12 is injection-molded onto the filter element 4 (FIG. 3) which in the mounted state is projecting seal-tightly into an opening 13 (FIG. 6) in the housing cover 3. The sealing part 12 can be formed as a 2-component part with the filter element.

Figure 6:
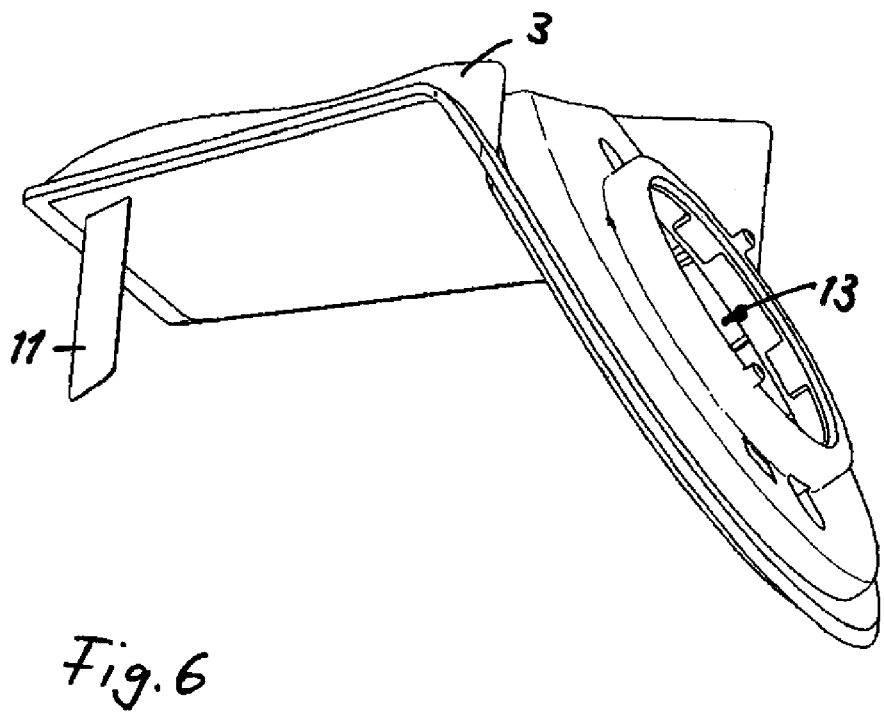
FIG. 6 shows the housing cover in perspective individual illustration.

FIG. 6 moreover shows that the housing cover 3 is designed to be approximately L-shaped and comprises a first section with the opening 13, which in the mounted state is positioned in front of the end face of the filter element 4, as well as a second section extending in axial direction from which the support section 11 is projecting in transverse direction. In the mounted state, the free end face of the support section 11 is resting on the lever element 9 and loads it with a tensioning force.

While specific embodiments of the invention have been shown and described in detail to illustrate the inventive principles, it will be understood that the invention may be embodied otherwise without departing from such principles.

What is claimed is:

1. A filter device comprising:
   a filter housing;
   a housing cover closing off the filter housing;
   a filter element closing around a longitudinal axis and having a first axial end face and an opposite second axial end face, the filter element comprising:
      an end disk secured on the first axial end face of the filter element, the end disk having a structure unit comprising:
         a clamping element having a first end secured directly on the end disk, the clamping element extending axially outwardly away from the filter element and end disk to terminate at a free second end; and
         a lever element having a first end secured on the end disk and connected to the first end of the clamping element, the lever element projecting axially outwardly away from the filter element and end disk and projecting radially outwardly away from the clamping element to an opposite free second end arranged radially outwardly beyond a radially outer contour of the filter element;
   wherein the clamping element is resting with a clamping force on a first housing part that is provided on the filter housing or on the housing cover, and
   wherein the lever element that, in the mounted state of the filter element in the filter housing, is resting on a second housing part that is provided on the filter housing or on the housing cover and force-loads the clamping element against the first housing part.

2. The filter device according to claim 1, wherein the clamping element and the lever element are configured as a single part.

3. The filter device according to claim 1, wherein the clamping element and the lever element together form the structural unit with a V-shaped cross-section.

4. The filter device according to claim 1, wherein the filter element is hollow-cylindrical.

5. The filter device according to claim 4, wherein the clamping element, the lever element, and the end disk are monolithically formed together as a single unitary part.

6. The filter device according to claim 4, wherein the clamping element and the end disk are monolithically formed together as a single unitary part.

7. The filter device according to claim 4, wherein the lever element and the end disk are monolithically formed together as a single unitary part.

8. The filter device according to claim 4, further comprising
   a sealing part that is connected by injection molding to the end disk that comprises a central recess,
   wherein the sealing part is resting seal-tightly on the housing cover.

9. The filter device according to claim 1, wherein the lever element is elastic springy.

10. The filter device according to claim 1, wherein the clamping element is straight and extends in a direction of the longitudinal axis of the filter element.

11. The filter device according to claim 1, wherein the lever element is arranged at an angle relative to the clamping element.

12. The filter device according to claim 1, wherein the lever element and the clamping element are segment-shaped.

13. The filter device according to claim 1, wherein the first housing part is provided on the filter housing and the second housing part is provided on the housing cover so that the clamping element is resting on the filter housing and the lever element is resting on the housing cover.

14. A filter element comprising:
   a first axial end face and an opposite second axial end face,
   wherein the filter element closes around a longitudinal axis extending through the first ad the second axial end faces;
   an end disk secured on the first axial end face of the filter element, the end disk having a structure unit comprising:
      a clamping element having a first end secured directly on the end disk, the clamping element extending axially outwardly away from the filter element and end disk to terminate at a free second end; and
      a lever element having a first end secured on the end disk and connected to the first end of the clamping element, the lever element projecting axially outwardly away from the filter element and end disk and projecting radially outwardly away from the clamping element to an opposite free second end arranged radially outwardly beyond a radially outer contour of the filter element;
   wherein the clamping element is configured and adapted to rest with a clamping force on a first housing part, provided on the filter housing or on the housing cover, and
   wherein the lever element is configured and adapted to rest, in the mounted state of the filter element in the filter housing, on a second housing part that is provided on the filter housing or on the housing cover and to force-load the clamping element against the first housing part.

* * * * *